(12) United States Patent
Duan et al.

(10) Patent No.: US 12,386,009 B2
(45) Date of Patent: Aug. 12, 2025

(54) USER EQUIPMENT AIDED NR-LIGHT USER EQUIPMENT POSITIONING WITH ROUND TRIP TIME PROCEDURES

(71) Applicant: QUALCOMM Incorporated, San Diego, CA (US)

(72) Inventors: Weimin Duan, San Diego, CA (US); Alexandros Manolakos, Escondido, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/777,947

(22) PCT Filed: Nov. 13, 2020

(86) PCT No.: PCT/US2020/060385
§ 371 (c)(1),
(2) Date: May 18, 2022

(87) PCT Pub. No.: WO2021/118756
PCT Pub. Date: Jun. 17, 2021

(65) Prior Publication Data
US 2022/0397632 A1    Dec. 15, 2022

(30) Foreign Application Priority Data

Dec. 12, 2019  (GR) ............................. 20190100554

(51) Int. Cl.
H04L 1/00       (2006.01)
G01S 5/00       (2006.01)
(Continued)

(52) U.S. Cl.
CPC .......... *G01S 5/0072* (2013.01); *H04L 5/0051* (2013.01); *H04W 24/10* (2013.01); *H04W 76/14* (2018.02)

(58) Field of Classification Search
CPC .... G01S 5/0072; H04L 5/0051; H04W 24/10; H04W 76/14; H04W 64/00
(Continued)

(56) References Cited

U.S. PATENT DOCUMENTS 9,998,856 B2    6/2018  Edge
2016/0095080 A1*  3/2016  Khoryaev ............. G01S 5/0284
                                                        455/456.1
(Continued)

FOREIGN PATENT DOCUMENTS

CN    107005297 A    8/2017
CN    109196925 A    1/2019
WO    2017196510 A1  11/2017

OTHER PUBLICATIONS

Fifth Generation Communication Automotive Research and Innovation Deliverable D3.1 Intermediate 5G V2X Radio; Zexian Li, Gabor Fodor (Year: 2018).*
(Continued)

Primary Examiner — Tanmay K Shah
(74) Attorney, Agent, or Firm — SUNSTEIN LLP/Qualcomm

(57) ABSTRACT

Techniques for positioning a bandwidth-limited user equipment (UE) are provided. An example method of positioning performed by a bandwidth-limited UE according to the disclosure includes receiving a first timing measurement signal from at least one proximate UE, wherein the at least one proximate UE is capable of using more bandwidth than
(Continued)

the bandwidth-limited UE, and transmitting a second timing measurement signal to the at least one proximate user equipment.

25 Claims, 13 Drawing Sheets

(51) Int. Cl.
    *H04L 5/00*         (2006.01)
    *H04W 24/10*      (2009.01)
    *H04W 76/14*      (2018.01)

(58) Field of Classification Search
    USPC .................................................. 455/456.1
    See application file for complete search history.

(56) References Cited

U.S. PATENT DOCUMENTS

| | | | |
|---|---|---|---|
| 2019/0069260 A1* | 2/2019 | Chae | G01S 5/0036 |
| 2020/0092685 A1* | 3/2020 | Fehrenbach | H04W 36/08 |
| 2020/0112845 A1* | 4/2020 | Zhao | H04L 51/58 |

OTHER PUBLICATIONS

Brahmi N., et al., "Deliverable D3.1 Intermediate 5G V2X Radio,"—5GCAR Version v1.0, May 31, 2018 (May 31, 2018), XP055610151, 121 pages, Internet Retrieved from the Internet: URL: https://5gcar.eu/wp-content/uploads/2018/08/5GCAR_D3.1_v1.0.pdf [retrieved on Jul. 31, 2019] section 3.3.2; p. 46-p. 47.

International Search Report and Written Opinion—PCT/US2020/060385—ISA/EPO—Feb. 11, 2021.

Intel Corporation: et al., "Running CR for the Introduction of NR Positioning", 3GPP Draft, 3GPP TSG-RAN WG2 Meeting #108, R2-1914727, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051816724, 61 Pages, Section 8.9.

* cited by examiner

USER EQUIPMENT AIDED NR-LIGHT USER EQUIPMENT POSITIONING WITH ROUND TRIP TIME PROCEDURES

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE (Long Term Evolution) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example method of positioning performed by a bandwidth-limited user equipment (UE) according to the disclosure includes receiving a first timing measurement signal from at least one proximate UE, wherein the at least one proximate UE is capable of using more bandwidth than the bandwidth-limited UE, and transmitting a second timing measurement signal to the at least one proximate user equipment.

Implementations of such a method may include one or more of the following features. The method may further include establishing a sidelink connection to the at least one proximate UE, wherein the first timing measurement signal may be received via the sidelink connection. The second timing measurement signal may be provided via the sidelink connection. The method may also include obtaining an identification for the at least one proximate UE from a transmission-reception point (TRP), and establishing a sidelink connection to the at least one proximate UE, receiving the first timing measurement signal via the sidelink connection, and transmitting the second timing measurement signal via the sidelink connection. A measurement request message may be provided to the at least one proximate UE prior to receiving the first timing measurement signal. Location information may be received from the at least one proximate UE. The first timing measurement signal and the second timing measurement signal may utilize a channel state information reference signal. The channel state information reference signal may be within a physical sidelink control channel.

An example of a method of positioning a bandwidth-limited user equipment (UE) performed by a UE according to the disclosure includes sending a first timing measurement signal to the bandwidth-limited UE, wherein the UE is capable of using more bandwidth than the bandwidth-limited UE, receiving a second timing measurement signal from the bandwidth-limited UE, and determining location information for the bandwidth-limited UE based at least on the first timing measurement signal and the second timing measurement signal.

Implementations of such a method may include one or more of the following features. The method may include establishing a sidelink connection to the bandwidth-limited UE, wherein the first timing measurement signal and the second timing measurement signal are sent and received via the sidelink connection. The first timing measurement signal and the second timing measurement signal may utilize a channel state information reference signal. The channel state information reference signal may be within a physical sidelink control channel. The location information may be provided to a network server and/or the bandwidth-limited UE. A signal may be received from the bandwidth-limited UE indicating how frequently the first timing measurement signal is to be sent. A signal may be received from the bandwidth-limited UE indicating that the UE should stop sending timing measurement signals. The method may also include receiving a plurality of measurement information from one or more other UEs, and determining the location information for the bandwidth-limited UE based at least on the plurality of measurement information. The plurality of measurement information may include a respective distance value between the bandwidth-limited UE and each of the one or more other UEs.

An example of a method of positioning a bandwidth-limited user equipment (UE) performed by a network entity according to the disclosure includes receiving an indication of one or more proximate UE from the bandwidth-limited UE, determining one or more participating UEs based on the indication of the one or more proximate UE, providing an indication of the one or more participating UEs to the bandwidth-limited UE, receiving measurement information from the one or more participating UEs, and calculating a location of the bandwidth-limited UE based at least on the measurement information.

Implementations of such a method may include one or more of the following features. The location of the bandwidth-limited UE may be provided to the bandwidth-limited UE and/or to at least one of the one or more participating UEs. Determining one or more participating UEs may include determining a quality of positioning for the one or more proximate UEs. Providing the indication of the one or more participating UEs may include providing a downlink reference signal identification value. Frame information associated with the downlink reference signal identification value may be provided. Receiving the measurement information may include averaging multiple measurements obtained from a participating UEs. The one or more participating UEs may include one or more base stations.

An example of a bandwidth-limited user equipment (UE) according to the disclosure includes a memory, a transceiver, at least one processor operably coupled to the memory and the transceiver and configured to receive, via the transceiver, a first timing measurement signal from at least one proximate UE, wherein the at least one proximate UE is capable of using more bandwidth than the bandwidth-limited UE, and transmit, via the transceiver, a second timing measurement signal to the at least one proximate user equipment.

Implementations of such a bandwidth-limited user equipment (UE) may include one or more of the following features. The processor may be further configured to establish a sidelink connection to the at least one proximate UE, such that the first timing measurement signal is received via the sidelink connection. The second timing measurement signal may be provided via the sidelink connection. The processor may be further configured to obtain an identification for the at least one proximate UE from a transmission-reception point (TRP), receive, via the transceiver, the first timing measurement signal via the sidelink connection, and transmit, via the transceiver, the second timing measurement signal via the sidelink connection. The processor may be further configured to provide a measurement request message to the at least one proximate UE prior to receiving the first timing measurement signal. The processor may be further configured to receive location information from the at least one proximate UE. The first timing measurement signal and the second timing measurement signal may utilize a channel state information reference signal. The channel state information reference signal may be within a physical sidelink control channel.

An example of a user equipment (UE) according to the disclosure includes a memory, a transceiver, at least one processor operably coupled to the memory and the transceiver and configured to send a first timing measurement signal to a bandwidth-limited UE, wherein the UE is capable of using more bandwidth than the bandwidth-limited UE, receive a second timing measurement signal from the bandwidth-limited UE, and determine location information for the bandwidth-limited UE based at least on the first timing measurement signal and the second timing measurement signal.

An example of a network entity according to the disclosure includes a memory, a transceiver, at least one processor operably coupled to the memory and the transceiver and configured to receive an indication of one or more proximate UE from a bandwidth-limited UE, determine one or more participating UEs based on the indication of the one or more proximate UE, provide an indication of the one or more participating UEs to the bandwidth-limited UE, receive measurement information from the one or more participating UEs, and calculate a location of the bandwidth-limited UEs based at least on the measurement information.

An example of an apparatus for positioning a bandwidth-limited user equipment (UE) according to the disclosure includes means for receiving a first timing measurement signal from at least one proximate UE, wherein the at least one proximate UE is capable of using more bandwidth than the bandwidth-limited UE, and means for transmitting a second timing measurement signal to the at least one proximate user equipment.

An example of an apparatus for positioning a bandwidth-limited user equipment (UE) according to the disclosure includes means for sending a first timing measurement signal to the bandwidth-limited UE, wherein the UE is capable of using more bandwidth than the bandwidth-limited UE, means for receiving a second timing measurement signal from the bandwidth-limited UE, and means for determining location information for the bandwidth-limited UE based at least on the first timing measurement signal and the second timing measurement signal.

An example of an apparatus for positioning a bandwidth-limited user equipment (UE) according to the disclosure includes means for receiving an indication of one or more proximate UE from the bandwidth-limited UE, means for determining one or more participating UEs based on the indication of the one or more proximate UE, means for providing an indication of the one or more participating UEs to the bandwidth-limited UE, means for receiving measurement information from the one or more participating UEs, and means for calculating a location of the bandwidth-limited UE based at least on the measurement information.

An example of a non-transitory computer-readable storage medium comprising computer-readable instructions configured to cause one or more processor to determine a position of a bandwidth-limited user equipment (UE) according to the disclosure includes code for receiving a first timing measurement signal from at least one proximate UE, wherein the at least one proximate UE is capable of using more bandwidth than the bandwidth-limited UE, and code for transmitting a second timing measurement signal to the at least one proximate user equipment.

An example of a non-transitory computer-readable storage medium comprising computer-readable instructions configured to cause one or more processor to determine a position of a bandwidth-limited user equipment (UE) according to the disclosure includes code for sending a first timing measurement signal to the bandwidth-limited UE, wherein the UE is capable of using more bandwidth than the bandwidth-limited UE, code for receiving a second timing measurement signal from the bandwidth-limited UE, and code for determining location information for the bandwidth-limited UE based at least on the first timing measurement signal and the second timing measurement signal.

An example of a non-transitory computer-readable storage medium comprising computer-readable instructions configured to cause one or more processor to determine a position of a bandwidth-limited user equipment (UE) according to the disclosure includes code for receiving an indication of one or more proximate UE from the bandwidth-limited UE, code for determining one or more participating UEs based on the indication of the one or more proximate UE, code for providing an indication of the one or more participating UEs to the bandwidth-limited UE, code for receiving measurement information from the one or more participating UEs, and code for calculating a location of the bandwidth-limited UE based at least on the measurement information.

Items and/or techniques described herein may provide one or more of the following capabilities, as well as other capabilities not mentioned. A bandwidth-limited user equipment (e.g., NR-Light UE, a reduced capabilities UE (i.e., NR RedCap UE), etc.), including medium-tier and low-tier user equipment (UE) such as wristwatches, fitness bands, or Internet of Things (IoT) devices, may have reduced bandwidth as compared to a UE, such as a smartphone, laptop, or similar device. A bandwidth-limited UE may be proximate to one or more UEs. The bandwidth-limited UE may exchange timing messages with the UEs via sidelink. A distance between the bandwidth-limited UE and a UE may be determined using round trip time estimates. A location of the bandwidth-limited UE may be determined using multi-lateral positioning based on the locations of the UEs and the measured distances. The position of the bandwidth-limited UE may be reported to a network. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The accompanying drawings are presented to aid in the description of various aspects of the disclosure and are provided solely for illustration of the aspects and are not limitations thereof.

DETAILED DESCRIPTION

Figure 1:
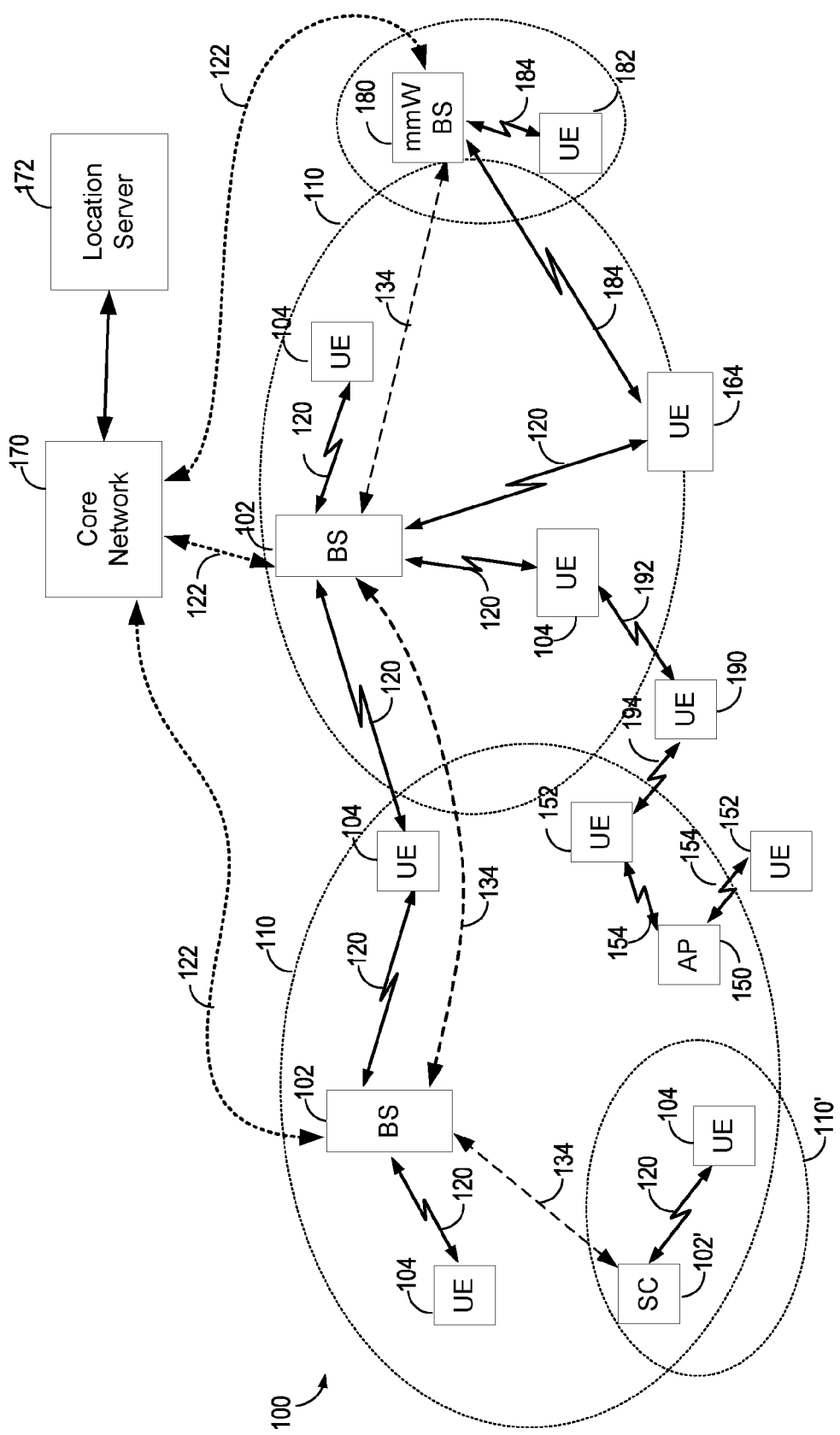
FIG. 1 illustrates an exemplary wireless communications system, according to various aspects.

Techniques are discussed herein for positioning a bandwidth-limited user equipment (UE). For example, a bandwidth-limited UE includes medium-tier and low-tier user equipment (e.g., a NR-Light UE, NR RedCap UE), and may be wearable devices (e.g., fitness tracker, watch) or other Internet of Things (IoT) devices with limited processing capacity. A NR-Light UE may be configured to operate on a reduced bandwidth (e.g., 5-20 MHz). The reduced bandwidth may result in reduced positioning accuracy. Further, the transmit power of a NR-Light UE may be reduced which may limit the coverage area in which the NR-Light UE may access a wireless network. The techniques provide herein enable a NR-Light UE to leverage the capabilities of proximate UE(s) such as smart phones, tablets, laptop computers (e.g., premium UEs) and other more capable devices to improve the positioning accuracy of the NR-Light UE. These techniques are examples only, and are not exhaustive.

Information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Many features are described in terms of sequences of actions to be performed by, for example, elements of a computing device. Various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory processor-readable storage medium having stored therein a corresponding set of computer-readable instructions that, upon execution, would cause or instruct an associated processor of a device to perform the functionality described herein. Thus, various features of the disclosure may be embodied in a number of different forms, all of which are within the scope of the claimed subject matter.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Referring to FIG. 1, an example wireless communications system 100 includes components as shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). The macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. One or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. The foregoing illustrations are examples and do not the description or claims.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth@, and so on. In an aspect, the UE 190 may be a NR-Light UE (e.g., NR RedCap UE), and the UE 104 to which it is connected over the D2D P2P link 192 may be a UE. In an example, the D2D P2P link 192 may be a sidelink channel configured to support channel state information reference signals (CSI-RS) and Channel Quality Information and Rank Indicator (CQI/RI) measurements.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
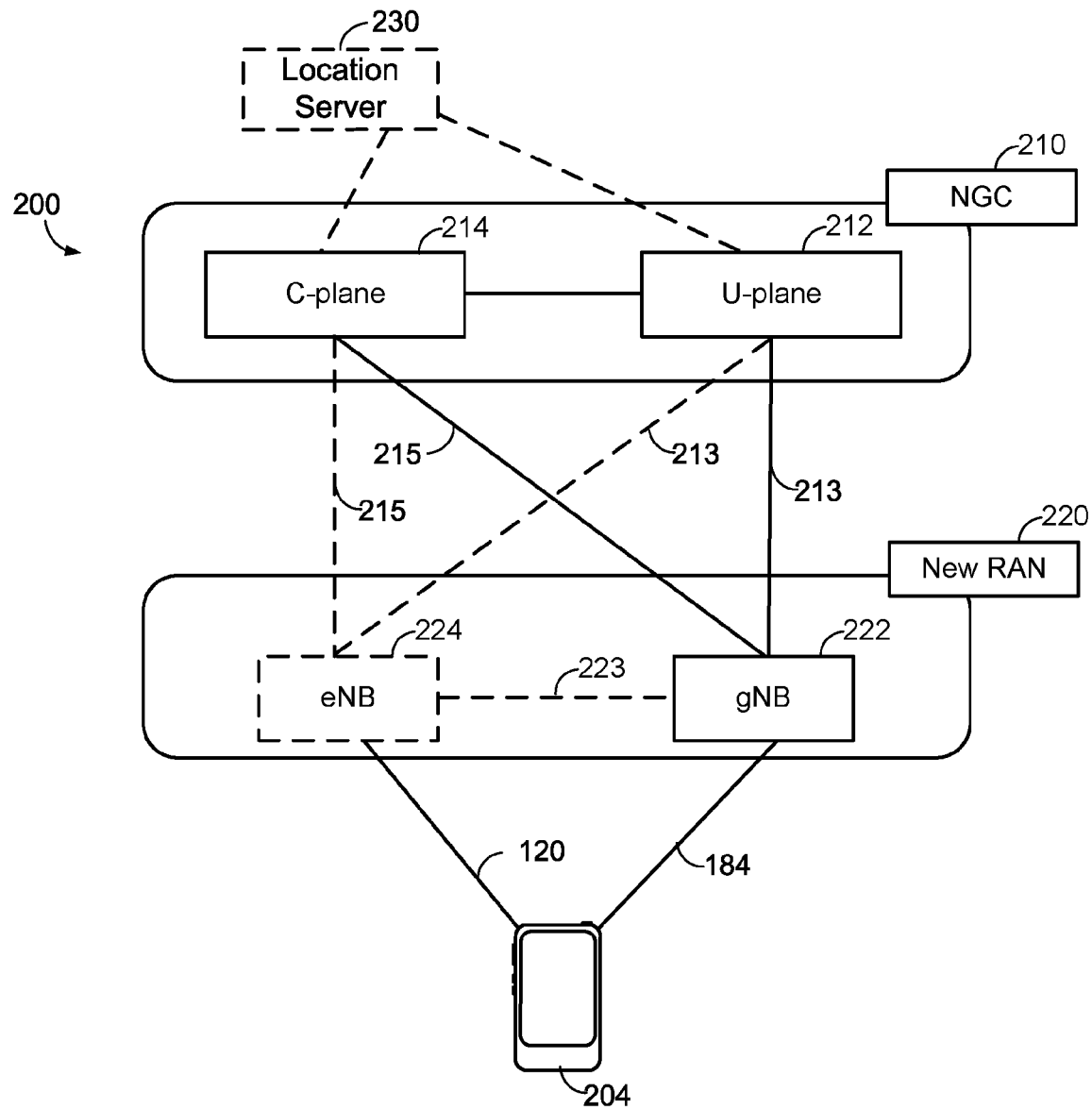
FIGS. 2A and 2B illustrate example wireless network structures, according to various aspects.

Referring to FIG. 2A, an example wireless network structure 200 is shown. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks. IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). A location server 230 may be included, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
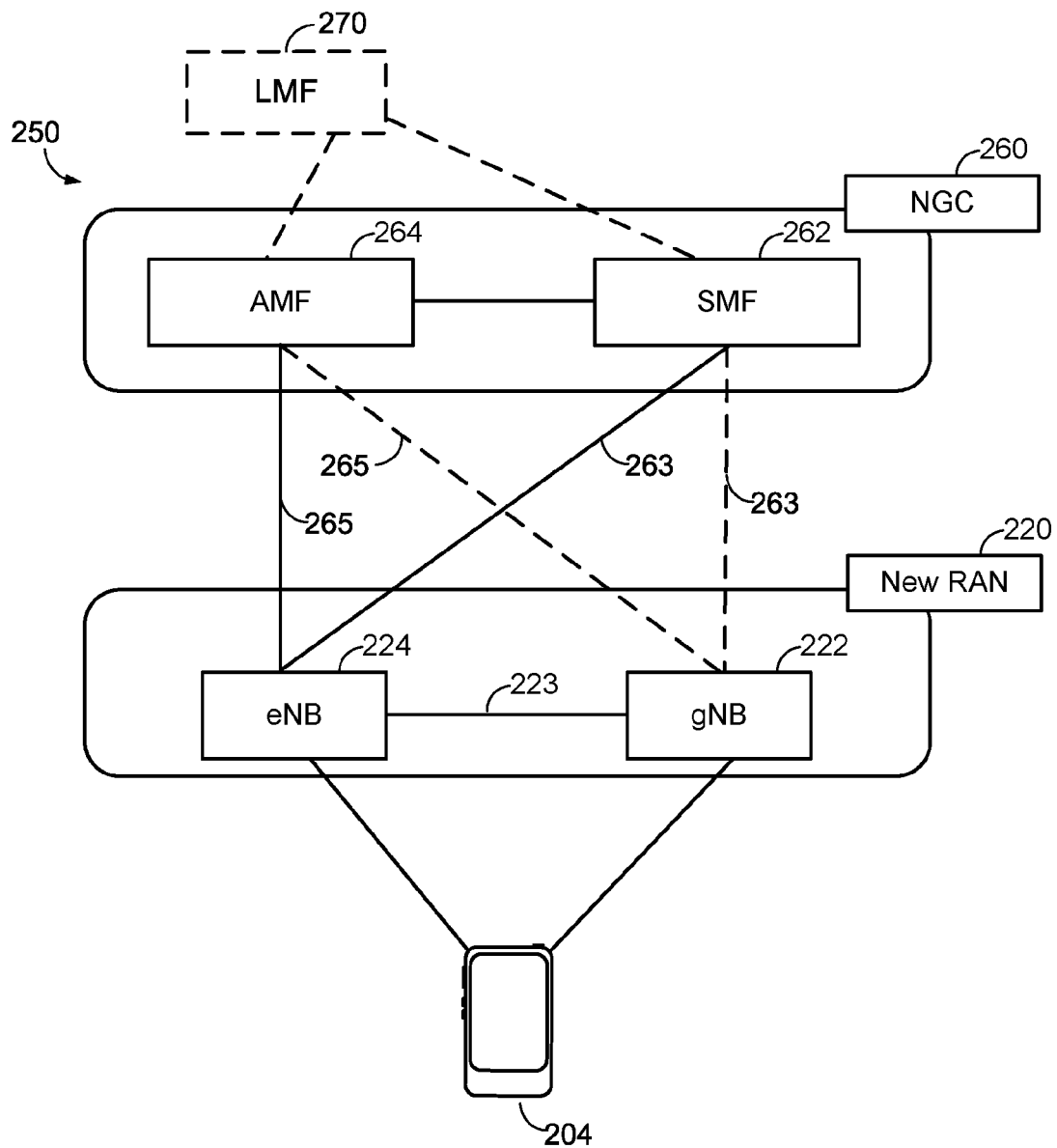

Referring to FIG. 2B, another example wireless network structure 250 is shown. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the Location Management Function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management. UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

The LMF 270 may be included, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
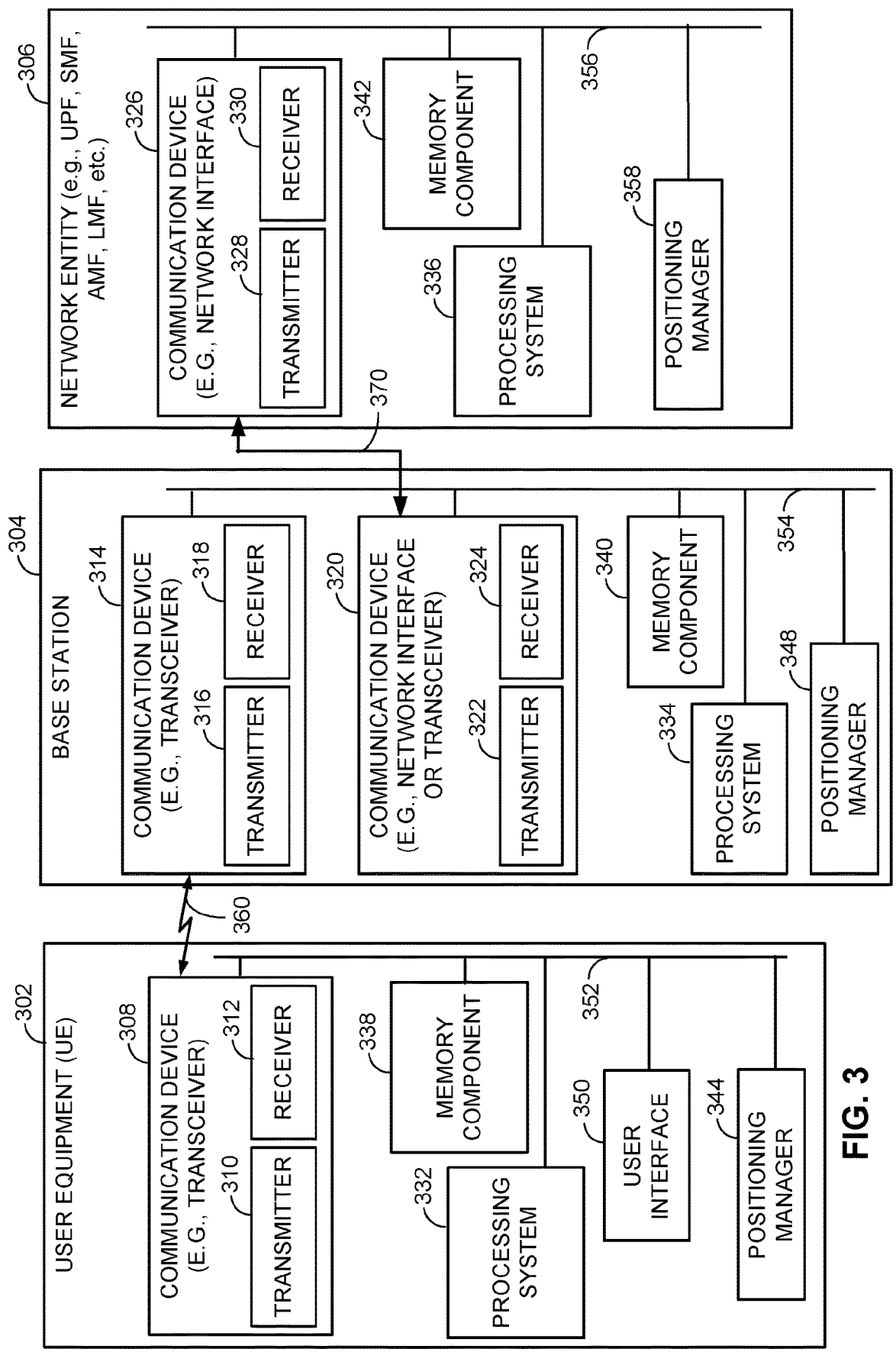
FIG. 3 is a block diagram illustrating exemplary apparatuses, according to various aspects.

Referring to FIG. 3, several sample components are shown (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the base station 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally the communication device 320) for communicating with other nodes. For example, the communication device 326 may comprise a network interface that is configured to communicate with one or more network entities via a wire-based or wireless backhaul 370 (which may correspond to the backhaul link 122 in FIG. 1). The communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such as a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for an RRC layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas of the communication device 314. The transmitter 316 may modulate an RF carrier with a respective spatial stream for transmission.

At the UE 302, the receiver 312 receives a signal through its respective antenna(s) of the communication device 308. The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

The apparatuses 302, 304, and 306 may include positioning managers 344, 348, and 358 respectively. The positioning managers 344, 348, and 358 may be hardware circuits that are part of or coupled to the processing systems 332, 334, and 336, respectively, that, when executed, cause the apparatuses 302, 304, and 306 to perform the functionality described herein. Alternatively, the positioning managers 344, 348, and 358 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs. Further, the UE 302 may be a NR-Light UE (e.g., NR RedCap UE) or a UE, depending on the capabilities and functionality of the UE 302 (e.g., number of antennas of the communication device 308, bandwidth processing capability of the communication device 308, processing capability of the processing system 332, etc.).

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 358 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, the positioning managers 344, 348, and 358, etc.

Figure 4:
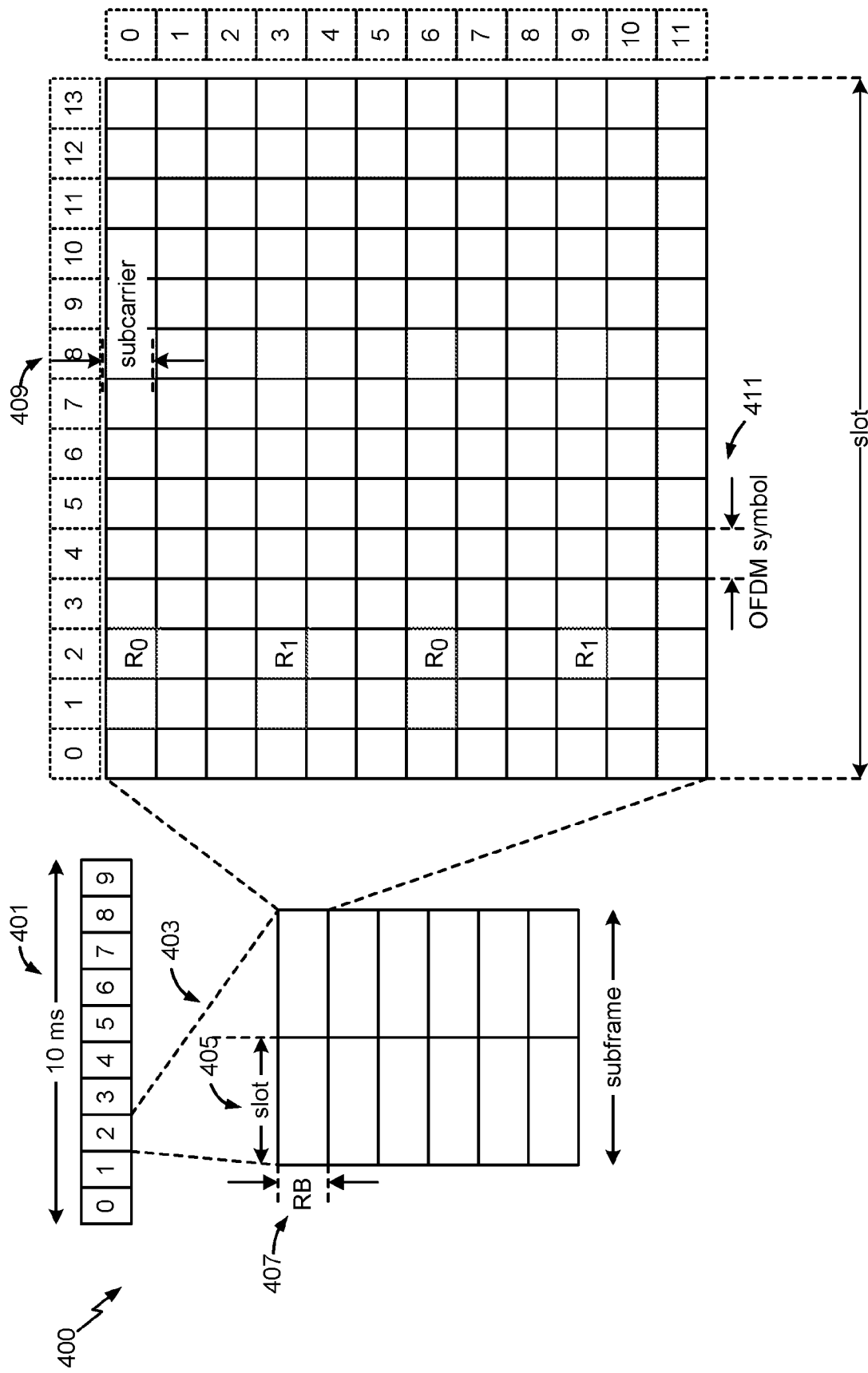
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). Referring to FIG. 4, an example of a downlink frame structure 400 according to aspects of the disclosure is shown. However, as those skilled in the art will readily appreciate, the frame structure for any particular application may be different depending on any number of factors. In FIG. 4, time is represented horizontally (e.g., on the X axis) with time increasing from left to right, while frequency is represented vertically (e.g., on the Y axis) with frequency increasing (or decreasing) from bottom to top. In the time domain, a frame 401 (10 ms) is divided into 10 equally sized subframes 403 (1 ms). Each subframe 403 includes two consecutive time slots 405 (0.5 ms).

A resource grid may be used to represent two time slots 405, each time slot 405 including one or more resource blocks (RBs) 407 (also referred to as "physical resource blocks" or "PRBs" in the frequency domain). In NR, for example, a resource block 407 contains 12 consecutive subcarriers 409 in the frequency domain and, for a normal cyclic prefix (CP) in each OFDM symbol 411, 14 consecutive OFDM symbols 411 in the time domain. A resource of one OFDM symbol length in the time domain and one subcarrier in the frequency domain (represented as a block of the resource grid) is referred to as a resource element (RE). As such, in the example of FIG. 4, there are 168 resource elements in a resource block 407.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 409, which are also commonly referred to as tones, bins, etc. Each subcarrier 409 may be modulated with data. In general, modulation symbols are sent in the frequency domain with OFDM and in the time domain with SC-FDM. The spacing between adjacent subcarriers 409 may be fixed, and the total number of subcarriers 409 (K) may be dependent on the system bandwidth. For example, the spacing of the subcarriers 409 may be 15 kHz and the minimum resource allocation (resource block) may be 12 subcarriers 409 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

With continued reference to FIG. 4, some of the resource elements (Res), indicated as $R_0$, $R_1$, $R_2$, $R_3$, $R_4$, $R_5$, $R_6$, $R_7$, include a downlink reference signal (DL-RS). The DL-RS may include cell-specific RS (CRS) (also sometimes called common RS) and UE-specific RS (UE-RS). UE-RS are transmitted only on the resource blocks 407 upon which the corresponding physical downlink shared channel (PDSCH) is mapped. The number of bits carried by each resource element depends on the modulation scheme. Thus, the more resource blocks 407 that a UE receives and the higher the modulation scheme, the higher the data rate for the UE.

In an aspect, the DL-RS may be positioning reference signals (PRS). A base station may transmit radio frames (e.g., radio frames 401), or other physical layer signaling sequences, supporting PRS signals according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS is referred to as a "PRS resource." The collection of resource elements can span multiple PRBs in the frequency domain and N (e.g., 1 or more) consecutive symbol(s) 411 within a slot 405 in the time domain. In a given OFDM symbol 411, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource." can also be referred to as a "beam." Note that this does not have any implications on whether the TRPs and the beams on which PRS are transmitted are known to the UE.

A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 5:
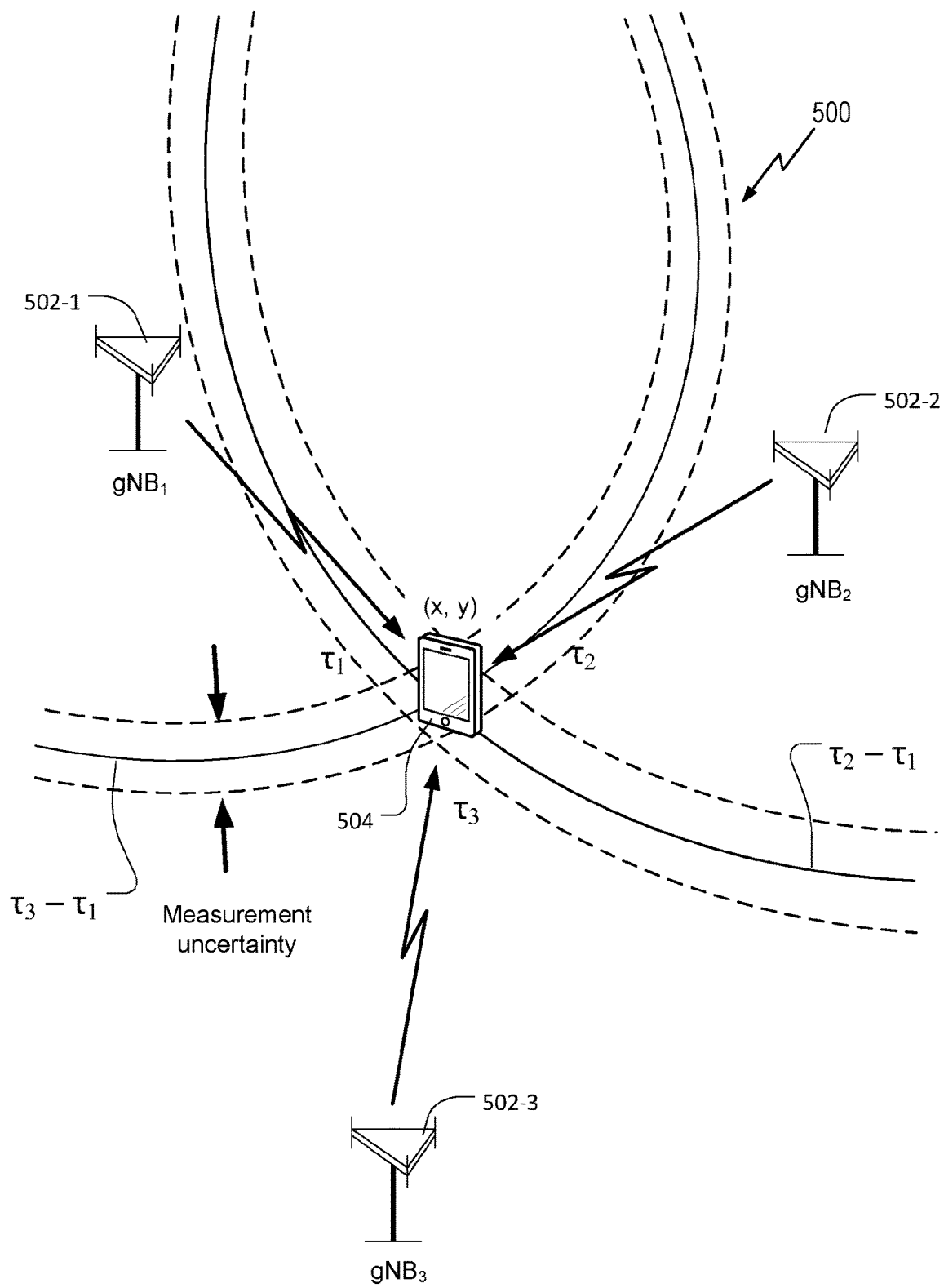
FIGS. 5 and 6 are diagrams illustrating exemplary techniques for determining a position of a mobile device using information obtained from a plurality of base stations.

Referring to FIG. 5, an exemplary wireless communications system 500 according to various aspects of the disclosure is shown. In the example of FIG. 5, a UE 504, which may correspond to any of the UEs described herein, is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the base stations locations, geometry, etc.), the UE 504 may determine its position, or assist in the determination of its position, in a predefined reference coordinate system. In an aspect, the UE 504 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 5 illustrates one UE 504 and three base stations 502-1, 502-2, 502-3, as will be appreciated, there may be more UEs 504 and more or fewer base stations.

To support position estimates, the base stations 502-1, 502-2, 502-3 may be configured to broadcast positioning reference signals (e.g., PRS, NRS, TRS, CRS, etc.) to UEs 504 in their coverage area to enable a UE 504 to measure characteristics of such reference signals. For example, the observed time difference of arrival (OTDOA) positioning method is a multilateration method in which the UE 504 measures the time difference, known as a reference signal time difference (RSTD), between specific reference signals (e.g., PRS, CRS. CSI-RS, etc.) transmitted by different pairs of network nodes (e.g., base stations, antennas of base stations, etc.) and either reports these time differences to a location server, such as the location server 230 or LMF 270, or computes a location estimate itself from these time differences.

Generally, RSTDs are measured between a reference network node (e.g., base station 502-1 in the example of FIG. 5) and one or more neighbor network nodes (e.g., base stations 502-2 and 502-3 in the example of FIG. 5). The reference network node remains the same for all RSTDs measured by the UE 504 for any single positioning use of OTDOA and would typically correspond to the serving cell for the UE 504 or another nearby cell with good signal strength at the UE 504. In an aspect, where a measured network node is a cell supported by a base station, the neighbor network nodes would normally be cells supported by base stations different from the base station for the reference cell and may have good or poor signal strength at the UE 504. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 504 for the reference network node (e.g., base station 502-1 in the example of FIG. 5) and the neighbor network nodes (e.g., base stations 502-2 and 502-3 in the example of FIG. 5) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 504 as the reference network node.

In some cases. OTDOA assistance data may also include "expected RSTD" parameters, which provide the UE 504 with information about the RSTD values the UE 504 is expected to measure at its current location between the reference network node and each neighbor network node, together with an uncertainty of the expected RSTD parameter. The expected RSTD, together with the associated uncertainty, may define a search window for the UE 504 within which the UE 504 is expected to measure the RSTD value. OTDOA assistance information may also include reference signal configuration information parameters, which allow a UE 504 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., location server 230, LMF 270) may send the assistance data to the UE 504, alternatively, the assistance data can originate directly from the network nodes (e.g., base stations 502) themselves (e.g., in periodically broadcasted overhead messages, etc.). Alternatively, the UE 504 can detect neighbor network nodes itself without the use of assistance data.

The UE 504 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., location server 230/LMF 270, a base station 502) or the UE 504 may estimate a position of the UE 504. More particularly, the RSTD for a neighbor network node "k" relative to a reference network node "Ref" may be given as (ToA$_k$−ToA$_{Ref}$), where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau_2-\tau_1$ and $\tau_3-\tau_1$, where $\tau_1$, $\tau_2$, and $\tau_3$ represent the ToA of a reference signal from the transmitting antenna(s) of base station 502-1, 502-2, and 502-3, respectively. The UE 504 may then convert the ToA measurements for different network nodes to RSTD measurements and (optionally) send them to the location server 230/LMF 270. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 504 position may be determined (either by the UE 504 or the location server 230/LMF 270).

Still referring to FIG. 5, when the UE 504 obtains a location estimate using OTDOA measured time differences, the necessary additional data (e.g., the network nodes' locations and relative transmission timing) may be provided to the UE 504 by a location server (e.g., location server 230, LMF 270). In some implementations, a location estimate for the UE 504 may be obtained (e.g., by the UE 504 itself or by the location server 230/LMF 270) from OTDOA measured time differences and from other measurements made by the UE 504 (e.g., measurements of signal timing from global positioning system (GPS) or other global navigation satellite system (GNSS) satellites). In these implementations, known as hybrid positioning, the OTDOA measurements may contribute towards obtaining the UE's 504 location estimate but may not wholly determine the location estimate.

Uplink time difference of arrival (UTDOA) is a similar positioning method to OTDOA, but is based on uplink reference signals (e.g., sounding reference signals (SRS), uplink positioning reference signals (UL PRS)) transmitted by the UE (e.g., UE 504). Further, transmission and/or reception beamforming at the base station 502-1, 502-2, 502-3 and/or UE 504 can enable wideband bandwidth at the cell edge for increased precision. Beam refinements may also leverage channel reciprocity procedures in 5G NR.

In NR, there is no requirement for precise timing synchronization across the network. Instead, it is sufficient to have coarse time-synchronization across gNBs (e.g., within a cyclic prefix (CP) duration of the OFDM symbols). Round-trip-time (RT)-based methods generally only need coarse timing synchronization, and as such, are a practical positioning method in NR.

Figure 6:
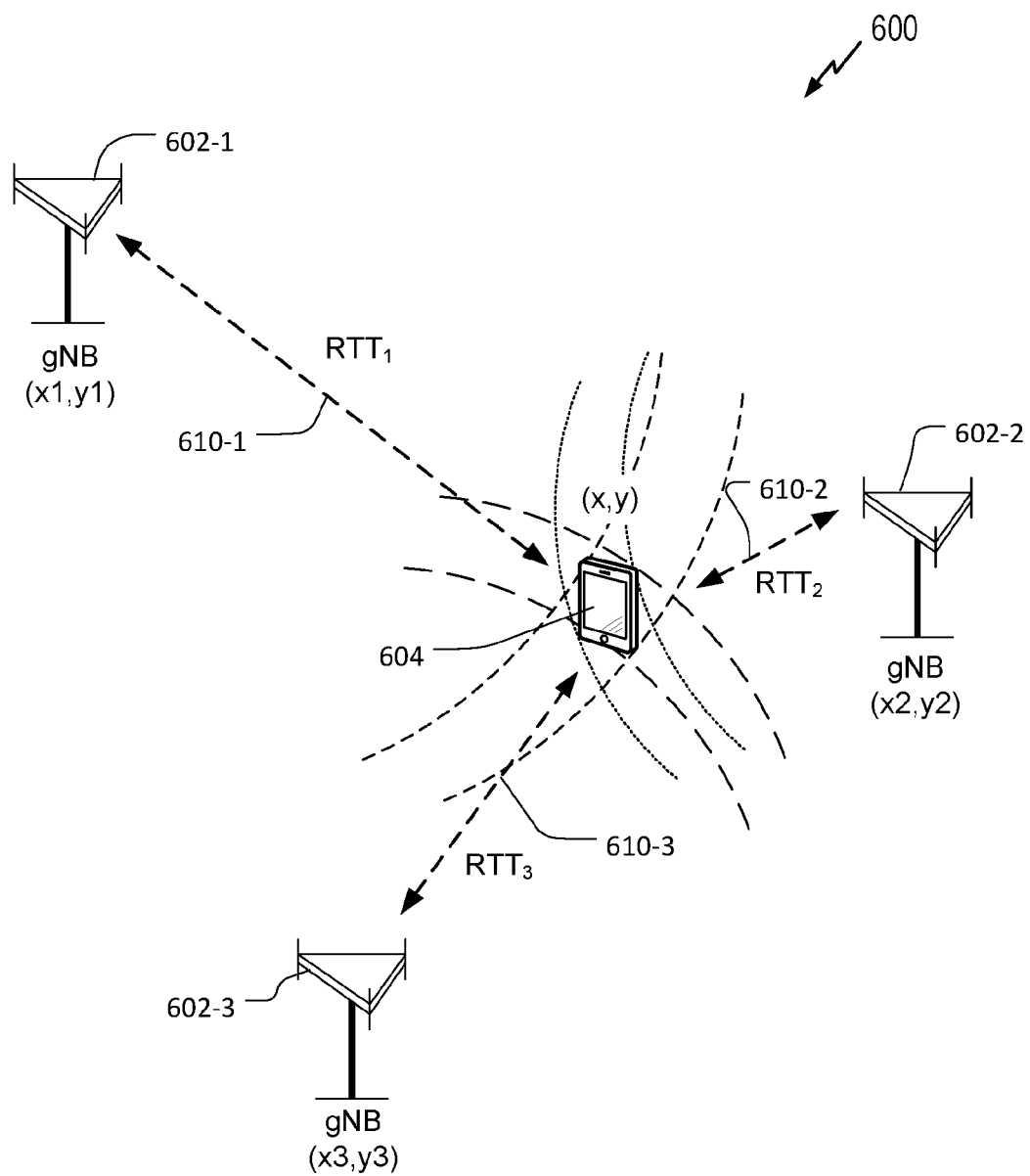

Referring to FIG. 6, an exemplary wireless communications system 600 according to aspects of the disclosure is shown. In the example of FIG. 6, a UE 604 (which may correspond to any of the UEs described herein) is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602-1, 602-2, and 602-3 (which may correspond to any of the base stations described herein) using RF signals and standardized protocols for the modulation of the RF signals and the exchange of information packets. By extracting different types of information from the exchanged RF signals, and utilizing the layout of the wireless communications system 600 (i.e., the base stations' locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 604 and three base stations 602-1, 602-2, 602-3, as will be appreciated, there may be more UEs 604 and more base stations.

To support position estimates, the base stations 602-1, 602-2, 602-3 may be configured to broadcast reference RF signals (e.g., PRS, NRS, CRS, TRS, CSI-RS, PSS, SSS, etc.) to UEs 604 in their coverage area to enable a UE 604 to measure characteristics of such reference RF signals. For example, the UE 604 may measure the ToA of specific reference RF signals (e.g., PRS, NRS, CRS, CSI-RS, etc.) transmitted by at least three different base stations and may use the RTT positioning method to report these ToAs (and additional information) back to the serving base station (e.g., base station 602-2) or another positioning entity (e.g., location server 230, LMF 270).

In an aspect, although described as the UE 604 measuring reference RF signals from a base station 602-1, 602-2, 602-3, the UE 604 may measure reference RF signals from one of multiple cells supported by a base station 602-1, 602-2, 602-3. Where the UE 604 measures reference RF signals transmitted by a cell supported by a base station 602-2, the at least two other reference RF signals measured by the UE 604 to perform the RTT procedure would be from cells supported by base stations 602-1, 602-3 different from the first base station 602-2 and may have good or poor signal strength at the UE 604.

In order to determine the position (x, y) of the UE 604, the entity determining the position of the UE 604 needs to know the locations of the base stations 602-1, 602-2, 602-3, which may be represented in a reference coordinate system as ($x_k$, $y_k$), where k=1, 2, 3 in the example of FIG. 6. Where one of the base stations 602-2 (e.g., the serving base station) or the UE 604 determines the position of the UE 604, the locations of the involved base stations 602-1, 602-3 may be provided to the serving base station 602-2 or the UE 604 by a location server with knowledge of the network geometry (e.g., location server 230, LMF 270). Alternatively, the location server may determine the position of the UE 604 using the known network geometry.

Either the UE 604 or the respective base station 602-1, 602-2, 602-3 may determine the distance ($d_k$, where k=1, 2, 3) between the UE 604 and the respective base station 602-1, 602-2, 602-3. In an aspect, determining the RTT 610-1, 610-2, 610-3 of signals exchanged between the UE 604 and any base station 602-1, 602-2, 602-3 can be performed and converted to a distance ($d_k$). RTT techniques can measure the time between sending a signaling message (e.g., reference RF signals) and receiving a response. These methods may utilize calibration to remove any processing and hardware delays. In some environments, it may be assumed that the processing delays for the UE 604 and the base stations 602-1, 602-2, 602-3 are the same. However, such an assumption may not be true in practice.

Once each distance $d_k$ is determined, the UE 604, a base station 602-1, 602-2, 602-3, or the location server (e.g., location server 230, LMF 270) can solve for the position (x, y) of the UE 604 by using a variety of known geometric techniques, such as, for example, trilateration. From FIG. 6, it can be seen that the position of the UE 604 ideally lies at the common intersection of three semicircles, each semicircle being defined by radius $d_k$ and center ($x_k$, $y_k$), where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 604 from the location of a base station 602-1, 602-2, 602-3). The intersection of the two directions at or near the point (x, y) can provide another estimate of the location for the UE 604.

A position estimate (e.g., for a UE 604) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

UEs may be classified as NR-Light UEs and/or a NR RedCap UE (e.g., wearables, such as smart watches, glasses, rings, etc.) and UEs (e.g., smartphones, tablet computers, laptop computers, etc.). The terms NR-Light UE and NR RedCap UE may be used interchangeably herein. NR-Light UEs generally have lower baseband processing capability, fewer antennas, lower operational bandwidth capabilities, and lower uplink transmission power compared to UEs. Different UE tiers can normally be differentiated by UE category or by UE capability. Certain tiers of UEs may also report to the network their type (NR-Light or). Alternatively, certain resources/channels may be dedicated to certain types of UEs.

As will be appreciated, the accuracy of NR-Light UE positioning may be limited. For example, a NR-Light UE may operate on a reduced bandwidth, such as 5 to 20 MHz for wearables and relaxed IoT (i.e., IoT devices with relaxed parameters, such as lower throughput, relaxed delay requirements, lower energy consumption, etc.), which results in lower positioning accuracy. As another example, a NR-Light UE's receiver processing capability may be limited due to its lower cost RF/baseband. As such, the reliability of measurements and positioning computations would be reduced. In addition, such a NR-Light UE may not be able to receive multiple PRS from multiple TRPs, further reducing positioning accuracy. As yet another example, the transmit power of a NR-Light UE may be reduced, meaning there would be a lower quality of uplink measurement for NR-Light UE positioning.

However, NR-Light UEs, such as wearables, are often operated around UEs. As such, the present disclosure provides techniques for a NR-Light UE to leverage the presence of one or more UEs to enhance its positioning accuracy.

Figure 7:
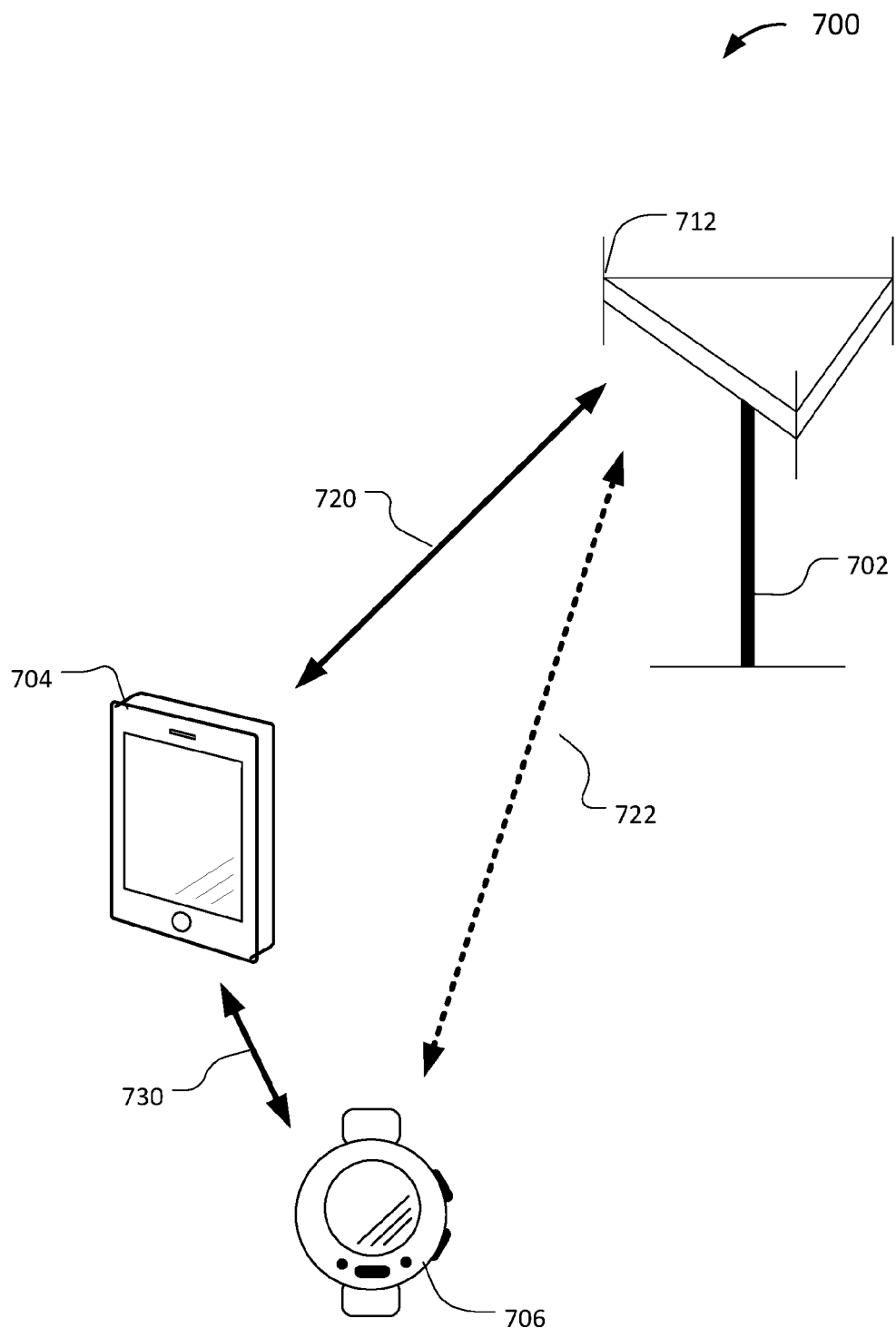
FIG. 7 is a diagram of an exemplary base station, UE, and NR-Light UE, according to aspects of the disclosure.

Referring to FIG. 7, a diagram 700 of an exemplary base station 702 (e.g., any of the base stations described herein), UE 704, and NR-Light UE 706, according to aspects of the disclosure are shown. The base station 702 has multiple antennas 712, and a panel of such antennas 712 (e.g., all antennas 712 on a particular side of the base station 702) may correspond to a cell and/or TRP supported by the base station 702. In the example of FIG. 7, the UE 704 is illustrated as a smartphone and the NR-Light UE 706 is illustrated as a smartwatch. The UE 704 may be described as a premium UE in that it has more capabilities than a bandwidth-limited UE such as the NR-Light UE 706. These, however, are examples and do not limit the disclosure.

As further illustrated in FIG. 7, the UE 704 is in communication with the base station 702 over a wireless communication link 720 (e.g., communication link 120), and the NR-Light UE 706 is in communication with the UE 704 over a wireless sidelink 730 (e.g., D2D P2P link 192, 194). The wireless sidelink 730 may be an NR sidelink, and may support a physical sidelink control channel (PSCCH) and/or physical sidelink control channel (PSSCH) between the UE 704 and the NR-Light UE 706. A sidelink CSI-RS may be confined within the PSSCH transmission. In an example, like the UE 704, the NR-Light UE 706 may also be able to communicate with the base station 702 over a wireless communication link 722 (e.g., communication link 120).

A NR-Light UE 706 may leverage the presence of one or more UEs 704 to enhance its positioning accuracy. The NR-Light UE 706 may use the position of the UE(s) 704 to derive its own position. When attempting to perform a positioning procedure, the NR-Light UE 706 may first search for UEs 704 around it (i.e., within wireless communication range). In some cases, the NR-Light UE 706 may already be connected to a UE 704 through a side link (e.g., wireless sidelink 730). In other cases, the NR-Light UE 706 may need to perform a scan to discover UE(s) 704 around it. In still other cases, the network (e.g., location server 230, LMF 270, base station 702) may notify the NR-Light UE 706 whether or not there are any UEs 704 around it, and if there are, provide it with a way to connect with them.

In an example, once connected to one or more UEs 704, the NR-Light UE 706 can select which UE(s)' 704 position(s) to use to derive its own location. In an aspect, the quality of the UE(s)' 704 position estimate(s) could be provided to the NR-Light UE 706 by the UE(s) 704 (e.g., over wireless sidelink 730) and/or by the network. The quality of the position estimate(s) could help with the selection of the UE(s) 704 for the association between the NR-Light UE 706 and the UE(s) 704.

Once the UE(s) 704 have been selected, the NR-Light UE 706 can use the position estimate(s) of the associated UE(s) 704 to derive its own position estimate. In an example, the NR-Light UE 706 can simply adopt the position of a connected UE 704 as its own position. In that case, the selected UE 704 may transmit its location to the NR-Light UE 706 (e.g., over wireless sidelink 730), which may then transmit it to the network (e.g., base station 702, over wireless communication link 720) or other entity requesting its position (e.g., an application running on the NR-Light UE 706). Alternatively, the selected UE 704 can notify the network (e.g., over wireless communication link 720) that the NR-Light UE's 706 position is the same as its own position (e.g., where the network is requesting the NR-Light UE's 706 position).

In an example, the precision of the position of the NR-Light UE 706 may be enhanced by utilizing Round Trip Time (RTT) procedures, or other terrestrial positioning techniques, with the communication link 720. In an example, the UE 704 may be configured to compute the relative position information of the NR-Light UE 706 based on RTT procedures. The UE 704 may report the relative position information to the base station 702 over the wireless communication link 720 and the network (e.g., location server 230, LMF 270) may be configured to perform the position estimate based on the relative position information reported by the UE 704. The NR-Light UE 706 may realize power savings by transmitting positioning reference signals (e.g., UL-PRS, SRS) to the UE(s) 704 over the wireless sidelink 730 instead of transmitting them to the base station(s) 702 over the wireless communication link 722. Because of the shorter range to the UE(s) 704 than to the base station 702, such uplink transmissions require lower transmit power.

Figure 8:
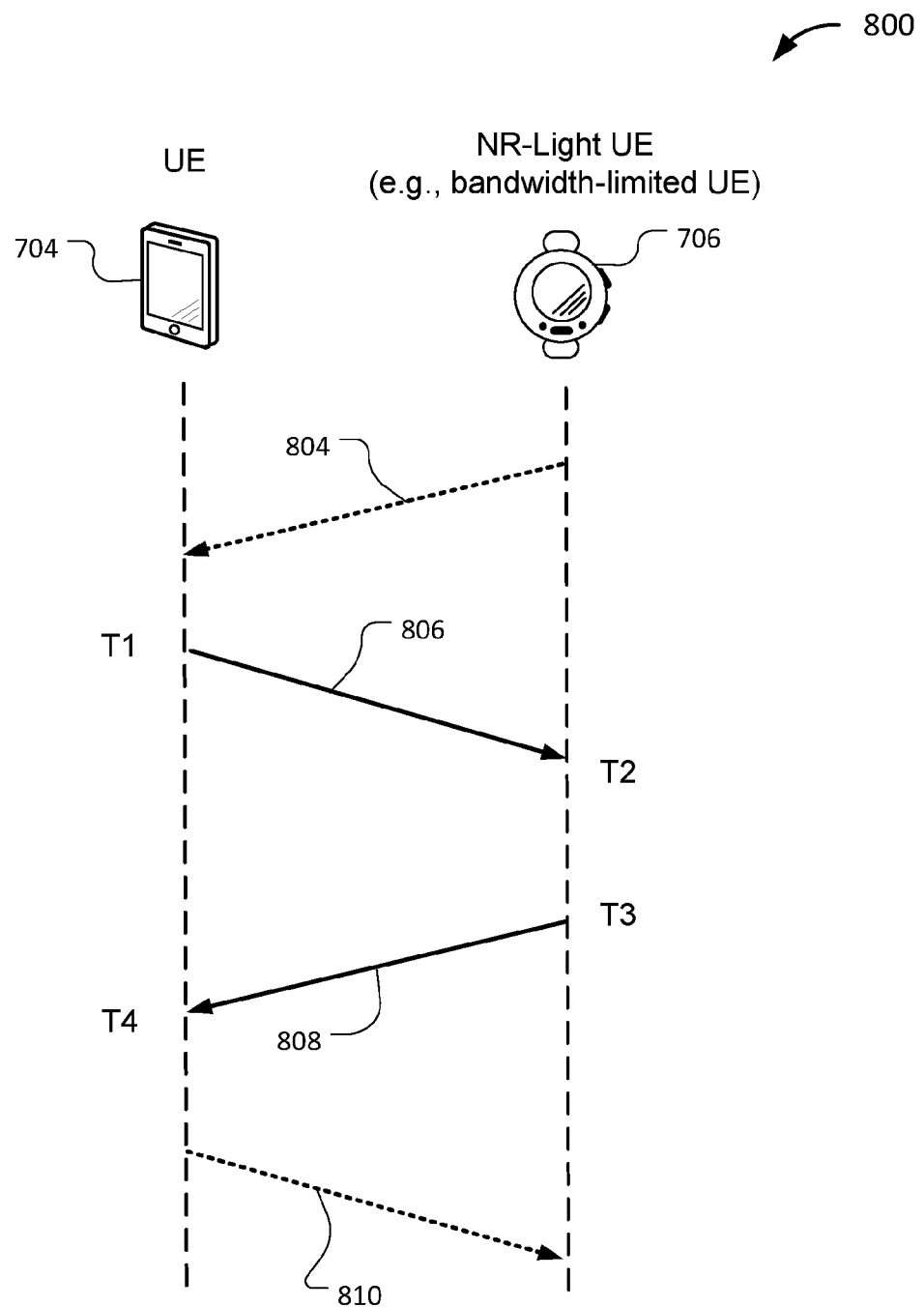
FIG. 8 is a message flow diagram of an example Round Trip Time (RTT) procedure between a UE and a NR-Light UE.

Referring to FIG. 8, with further reference to FIG. 7, a message flow diagram 800 of an example Round Trip Time (RTT) procedure between a UE 704 and a NR-Light UE 706 is shown. In an example, the NR-Light UE 706 may be configured to send a request measurement message 804 to the UE over the communication link 730. The UE 704 may be configured to transmit a downlink reference signal (DL-RS) 806 at time T1. In an example, the communication link 730 is a sidelink CSI-RS within a PSSCH transmission. The NR-Light UE 706 is configured to measure the Time of Arrival (TOA) of the DL-RS at time T2. The NR-Light UE 706 transmits an uplink reference signal (UL-RS) 808 at time T3 and reports the time difference between T2 and T3 (i.e., T3–T2). The UE 704 measures the TOA of the UL-RS 808 at time T4 and may be configured to calculate the distance from the NR-Light UE 704. For example, the distance 'd' may be calculated as:

$$d = \frac{1}{2c}*(T4-T1) - \frac{1}{2c}*(T3-T2) \quad (1)$$

where c is the speed of light.

In an example, the UE 704 may provide the measurement times T1-T4 to the base station 702 via the communication link 720, and the network (e.g., location server 230, LMF 270) may be configured to determine the distance between the UE 704 and the NR-Light UE 706. The UE 704 may optionally be configured to provide a results message 810 including the distance calculation to the NR-Light UE 706. While FIG. 8 illustrates the timing elements of a basic message flow between the UE 704 and the NR-Light UE 706, additional calibration factors to compensate for antenna feedline and other hardware related delays may be required to improve the accuracy of the distance measurement. In an example, the UE 704 may also utilize the AoA of the UL-RS 808 to estimate the position of the NR-Light UE 706. The UE(s) 704 may report the position estimate to the NR-Light UE 706 and/or the network.

Figure 9:
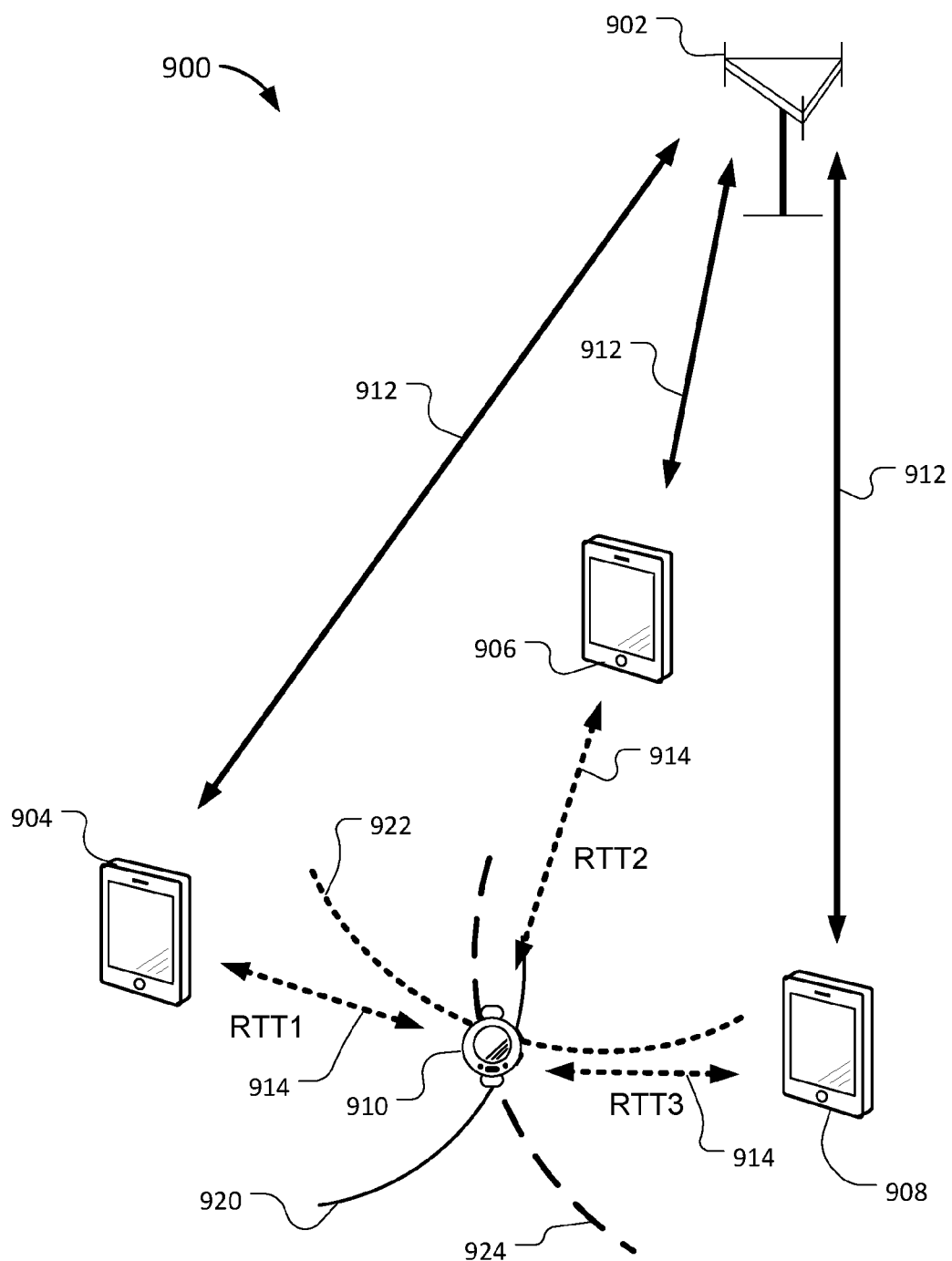
FIG. 9 is a diagram of an example procedure for positioning a NR-Light UE with multiple UEs.

Referring to FIG. 9, with further reference to FIGS. 7 and 8, a diagram 900 of an example procedure for positioning a NR-Light UE 910 with multiple UEs is shown. The diagram 900 includes base station 902, a first UE 904, a second UE 906, a third UE 908, and a NR-Light UE 910. The UEs 904, 906, 908 are in communication with the base station 902 via a wireless communication link (e.g., communication link 120). In an embodiment, the NR-Light UE 910 may also be able to communicate with the base station 902 over a wireless communication link 912. The NR-Light UE 910 is in communication with each of the UEs 904, 906, 908 via a wireless sidelink 914. The wireless sidelink 914 may be an NR sidelink, and may support a physical sidelink control channel (PSCCH) and/or physical sidelink control channel (PSSCH) between the UEs 904, 906, 908 and the NR-Light UE 910. In an example, the UEs 904, 906, 908 or the NR-Light UE 910 may use the sidelink CSI-RS transmitted for CQI for positioning. The and NR-Light UEs may transmit CSI-RS within the PSSCH transmission and the receiving UE may measure the corresponding transmit and receive times (e.g., TOAs). The positioning measurements may be multiplexed on the same channel that the CQI/RI is fed back to the UE transmitting the CSI-RS. In an example, a special CSI-RS may be used for the positioning measurements (e.g., staggered pattern, single and not 2 ports, higher density).

In operation, the NR-Light UE 910 may be configured to repeat the basic RTT procedure depicted in FIG. 8 with multiple UEs. The corresponding multiple RTT measurements may be used for multilateral positioning. For example, a first RTT exchange RTT1 between the UE 904 and the NR-Light UE 910 is used to determine a first distance 920. Similarly, a second RTT exchange RTT2 and a third RTT exchange RTT3 may be used to determine a respective second distance 922 and a third distance 924. The UEs 904, 906, 908 may report the RT measurements in a higher layer signaling protocol, such as a LPP-type protocol, between the base station 902 and the UEs 904, 906, 908. The RTT measurements may include multiple observations and pruning and averaging across the observations may be used to improve the position estimate. The procedure may be performed independently with each of the UEs 904, 906, 908 without synchronization of the UEs.

In an example, the NR-Light UE 910 could request the network (e.g., location server 230, LMF 270) to perform the position estimate based on the measurements reported by the associated UE(s) 904, 906, 908. The NR-Light UE 910 may send the relevant measurements to the network itself (e.g., over wireless communication link 912), or, to save overhead, request that the UE(s) 904, 906, 908 send the measurements directly to the network. The network (e.g., location server 230, LMF 270) may then calculate an estimate of the NR-Light UE's 910 position based on the measurements taken by the UE(s) 904, 906, 908.

The NR-Light UE 910 may be configured to search and report to the base station 902 (or other network resource) the UEs that are nearest to the NR-Light UE 910. In the case of an excess number of UEs (i.e., more than three), the network (e.g., location server 230, LMF 270) may select which UEs to participate in the NR-Light UE positioning. The selection may be based on the arability and quality of the positioning of the UEs. The network may notify the NR-Light UE 910 (via the communication link 912) which group of UEs could participate in its positioning. The NR-Light UE 910 may request RT measurements from the available UEs. The request may indicate a frequency of RTT measurements the NR-Light UE 910 will require from a UE. For example, the NR-Light UE 910 may utilize internal sensors (e.g., accelerometers, gyroscopes, magnetic compass) to detect a mobility pattern, which may indicate how frequently the positioning information needs to be updated. The NR-Light UE 910 may be configured to request measurements of specific DL-RS IDs of a UE. The requested measurements may be obtained at a specified occasion in time (e.g., RTT derived from DL-RS ID=5 on frame 100). The NR-Light UE 910 may also be configured to signal a UE to stop reporting measurement information. For example, the NR-Light UE 910 may remain stationary for an extended period and thus reduce the need for the UE to report the location information.

In an example, the UEs 904, 906, 908 may be configured to communicate with one another via wireless link 912, a sidelink, or other wireless protocol. One of the UEs (e.g., the first UE 904), may be configured to determine the location of the NR-Light UE 910 and may receive the RTT measurement information from the other UEs 906, 908. The first UE 904 may receive the timing information or the corresponding distance results from the other UEs 906, 908. The first UE 904 may determine the location of the NR-Light UE 910 or provide measurement information to the base station 902 and receive the location via the wireless link 912. The first UE 904, or the base station 902 may provide the location to the NR-Light UE 910.

Figure 10:
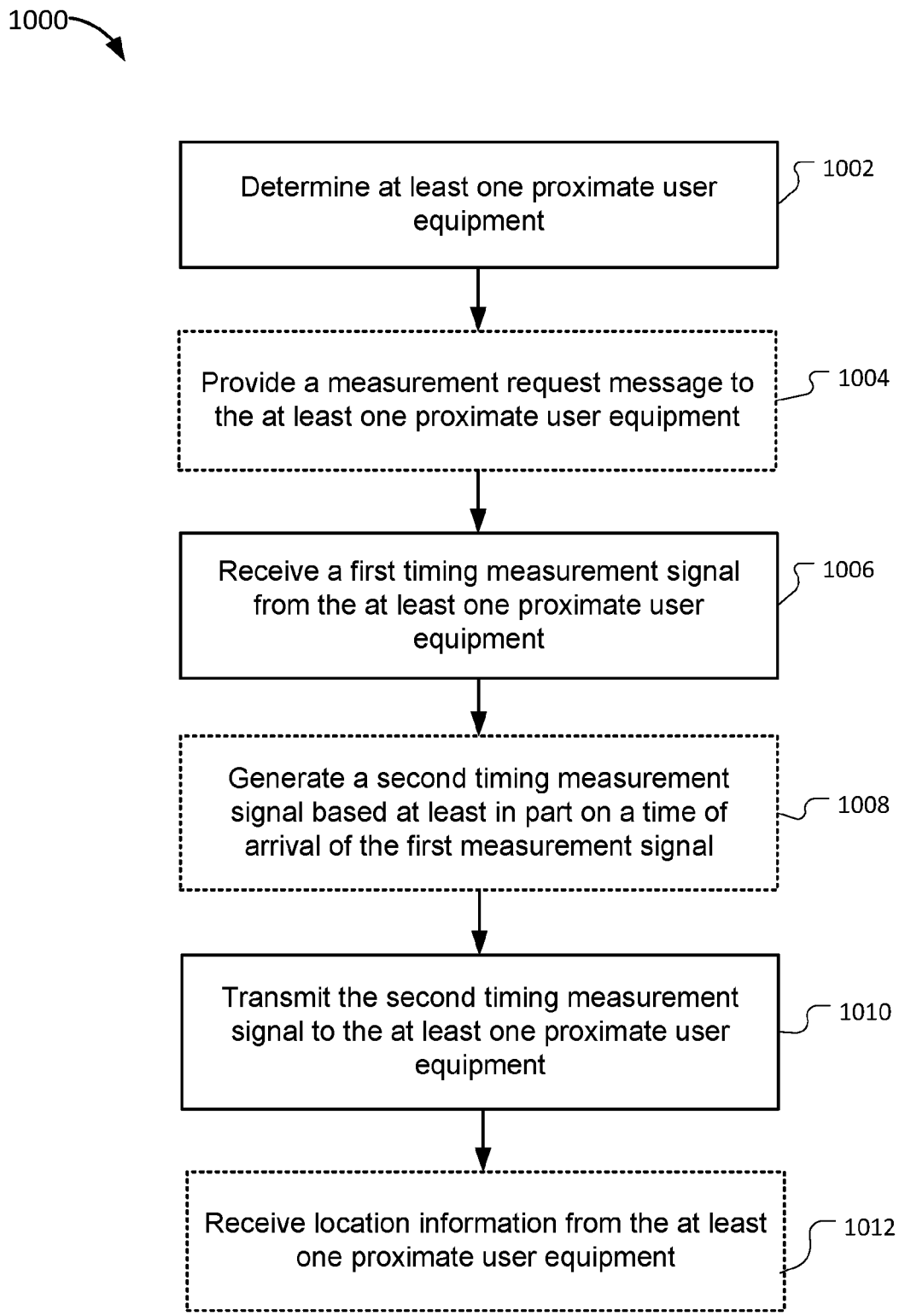
FIG. 10 is a process flow diagram of an example method for determining location information with a bandwidth-limited UE.

Referring to FIG. 10, with further reference to FIGS. 1-9, a method 1000 of determining location information with a bandwidth-limited user equipment (UE) includes the stages shown. The method 1000 is, how-ever, an example only and not limiting. The method 1000 may be altered, e.g., by having stages added, removed, rearranged, combined, performed concurrently, and/or having single stages split into multiple stages. For example, stages 1004, 1008 and 1012 described below are optional. Still other alterations to the method 1000 as shown and described are possible.

At stage 1002, the method 1000 includes determining at least one proximate user equipment. The communication device 308 in a NR-Light UE 706 may be a means for determining a proximate user equipment. The NR-Light UE 706 is configured to utilize the wireless sidelink channel 730 to search for UEs 704 around it (i.e., within wireless communication range). In some cases, the NR-Light UE 706 may already be connected to a UE 704 through a side link (e.g., wireless sidelink 730). In an example, the network (e.g., location server 230, LMF 270, base station 702) may notify the NR-Light UE 706 of the at least one proximate user equipment and provide instructions to enable the devices to communicate. The notification may include identification information such as a device ID, user ID, or other information to identify the proximate user equipment.

At stage 1004, the method 1000 optionally includes providing a measurement request message to the at least one proximate user equipment. The communication device 308 in the NR-Light UE 706 may be a means for providing a measurement request message. The measurement request message 804 may be provided via the sidelink channel 730 and is configured to indicate that the NR-Light UE 706 is ready to receive timing messages from the UE 704.

At stage 1006, the method 1000 includes receiving a first timing measurement signal from the at least one proximate user equipment. The communication device 308 in the NR-Light UE 706 may be means for receiving a first timing measurement signal. In an example, the UE 704 may be configured to transmit a DL-RS 806 at time T1 as the first timing measurement signal and the NR-Light UE 706 is configured to measure the TOA of the DL-RS at time T2. Multiple UEs, such as the UEs 904, 906, 908, may be configured to each send a DL-RS message and the NR-Light UE 706 may be configured to capture the TOA information for each of the respective DL-RS messages.

At stage 1008, the method 1000 optionally includes generating a second timing measurement signal based at least in part on a time of arrival of the first measurement signal. The processing system 332 and the communication device 308 in the NR-Light UE 706 are a means for generating and providing a second timing measurement signal. The NR-Light UE 706 is configured send the UL-RS message 808 to the UE 704 at time T3. For multiple UEs, the NR-Light UE 706 may provide a UL-RS message to each of the UEs at a respective T3. The second timing measurement signal may include an indication of the difference of the TOA of the first timing measurement signal (i.e., DL-RS 806) and the transmit time of the UL-RS message 808 (i.e., T3). In an example, the second timing measurement signal may be generated and transmitted at stage 1010. The NR-Light UE 706 is configured to send the UL-RS message 808 and report the time difference (i.e., T3–T2) to the UE 704.

At stage 1012, the method 1000 optionally includes receiving location information from the at least one proximate user equipment. The communication device 308 in the NR-Light UE 706 is a means for receiving the location information. In an example, the UE 704 or a network resource (e.g., location server 230, LMF 270, base station 702) may be configured to determine a distance between the NR-Light UE 706 and the UE 704 based on the timing measurement information. The distance information may be provided to the NR-Light UE via the optional results message 810. In an example, the UE 704 may utilize AoA information to determine a bearing to the NR-Light UE. Multiple UEs may provide similar distance and range results, or the corresponding measurement information, to the UE 704 (e.g., via the base station 702), and the location information may be an estimated location of the NR-Light UE 706. In an example, a network resource may compute the location of the NR-Light UE 706 based on information provided by multiple UEs and provide the location information to the NR-Light UE 706 via the UE 704.

Figure 11:
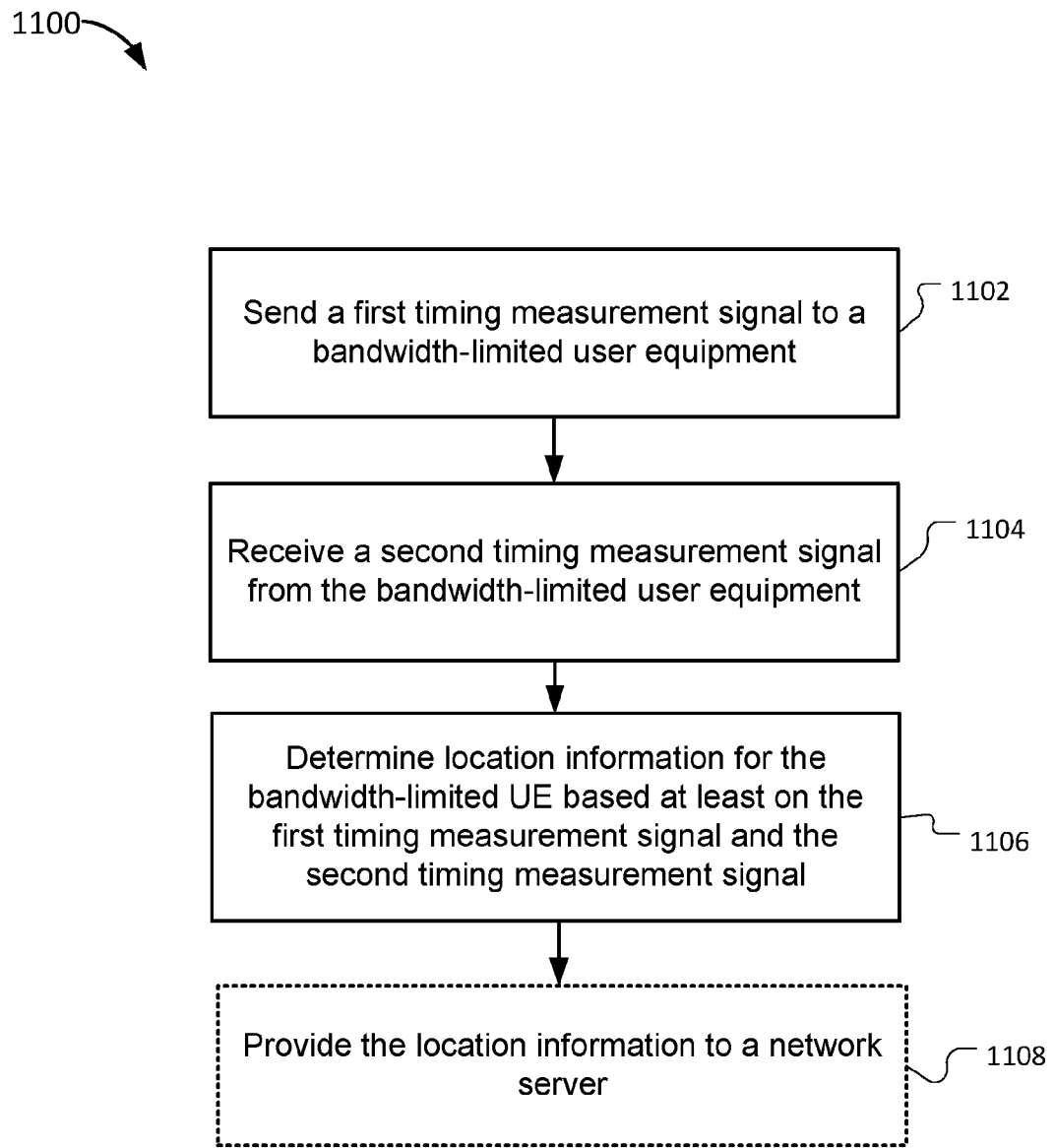
FIG. 11 is a process flow diagram of an example method for determining bandwidth-limited UE location information with a UE.

Referring to FIG. 11, with further reference to FIGS. 1-9, a method 1100 for determining bandwidth-limited UE location information with a UE includes the stages shown. The method 1100 is, however, an example only and not limiting. The method 1100 may be altered, e.g., by having stages added, removed, rearranged, combined, performed concurrently, and/or having single stages split into multiple stages. For example, stage 1108 for providing location information to a network server is optional. Still other alterations to the method 1100 as shown and described are possible.

At stage 1102, the method 1100 includes sending a first timing measurement signal to a bandwidth-limited user equipment. The communication device 308 of the UE 704 is a means for sending the first timing measurement signal. The UE 704 is capable of using more bandwidth than the bandwidth-limited UE. The NR-Light UE 706 is an example of a bandwidth-limited UE. The UE 704 may be in communication with the base station 702 over a wireless communication link 720 (e.g., communication link 120), and the NR-Light UE 706 is in communication with the UE 704 over a wireless sidelink 730. The wireless sidelink 730 may be an NR sidelink, and may support a physical sidelink control channel (PSCCH) and/or physical sidelink control channel (PSSCH) between the UE 704 and the NR-Light UE 706. The UE 704 may be configured to send the first timing measurement signal as a downlink reference signal (DL-RS) 806 at time T1. In an example, the first timing measurement signal is provided via a sidelink CSI-RS within a PSSCH transmission.

At stage 1104, the method 1100 includes receiving a second timing measurement signal from the NR-Light user equipment. The communication device 308 of the UE 704 is a means for receiving the second timing measurement signal. The NR-Light UE 706 is configured to measure the Time of Arrival (TOA) of the first timing measurement signal send at stage 1102. For example, the TOA of the DL-RS 806 is time T2 as depicted in FIG. 8. The NR-Light UE 706 is configured to transmit the second timing measurement signal to the UE 704 based in part on the TOA of the first timing measurement signal. For example, the UE 704 is configured to receive the UL-RS 808 at T4. The NR-Light UE 706 may include the time difference between T2 and T3 (i.e., T3−T2) in the second timing measurement signal. The UE 704 may also be configured to determine AoA information based on the second timing message. The AoA information may be used to determine a bearing to the NR-Light UE 706.

At stage 1106, the method 1100 includes determining location information for the bandwidth-limited UE based at least on the first timing measurement signal and the second timing measurement signal. The processing system 332 in the UE 704 is a means for determining location information. In an example, the UE 704 measures the TOA of the UL-RS 808 at time T4 and calculates the location information (e.g., distance from the NR-Light UE 704) as described above at equation (1). The UE 704 may provide the timing measurements to a network server and receive the calculated distance from the network.

At stage 1108, the method 1100 optionally includes providing the location information to a network server. The communication device 308 of the UE 704 is a means for providing the location information. In an example, the UE may determine the distance and bearing to the NR-Light UE 706. The UE may provide the calculated distance (and possible bearing) to the base station 702 via the wireless link 720. The calculated measurements may be included in a higher layer signaling package, such as a LPP-type protocol. The UE 704 may be configured to provide the timing message information (e.g., T1, T2, T3, T4) to the network server (e.g., location server 230, LMF 270) to compute the location information (e.g., distance, bearing). In an example with multiple UEs, such as the UEs 904, 906, 908, the network server may utilize the location of the UEs and the location information obtained via the RTT exchanges (e.g., RTT1, RTT2, RTT3) to compute a location estimate of the NR-Light UE 910. The location estimate may be provided to the NR-Light UE 910 directly via the wireless link 912, or via one of the UEs 904, 906, 908 using the wireless link 912 and the sidelink 914. In an example, the NR-Light UE 706 may provide a signal to the UE 704 indicating how frequently the RTT exchanges will occur. The NR-Light UE 706 may also provide a signal to the UE 704 instructing the UE 704 to stop sending RTT messages.

Figure 12:
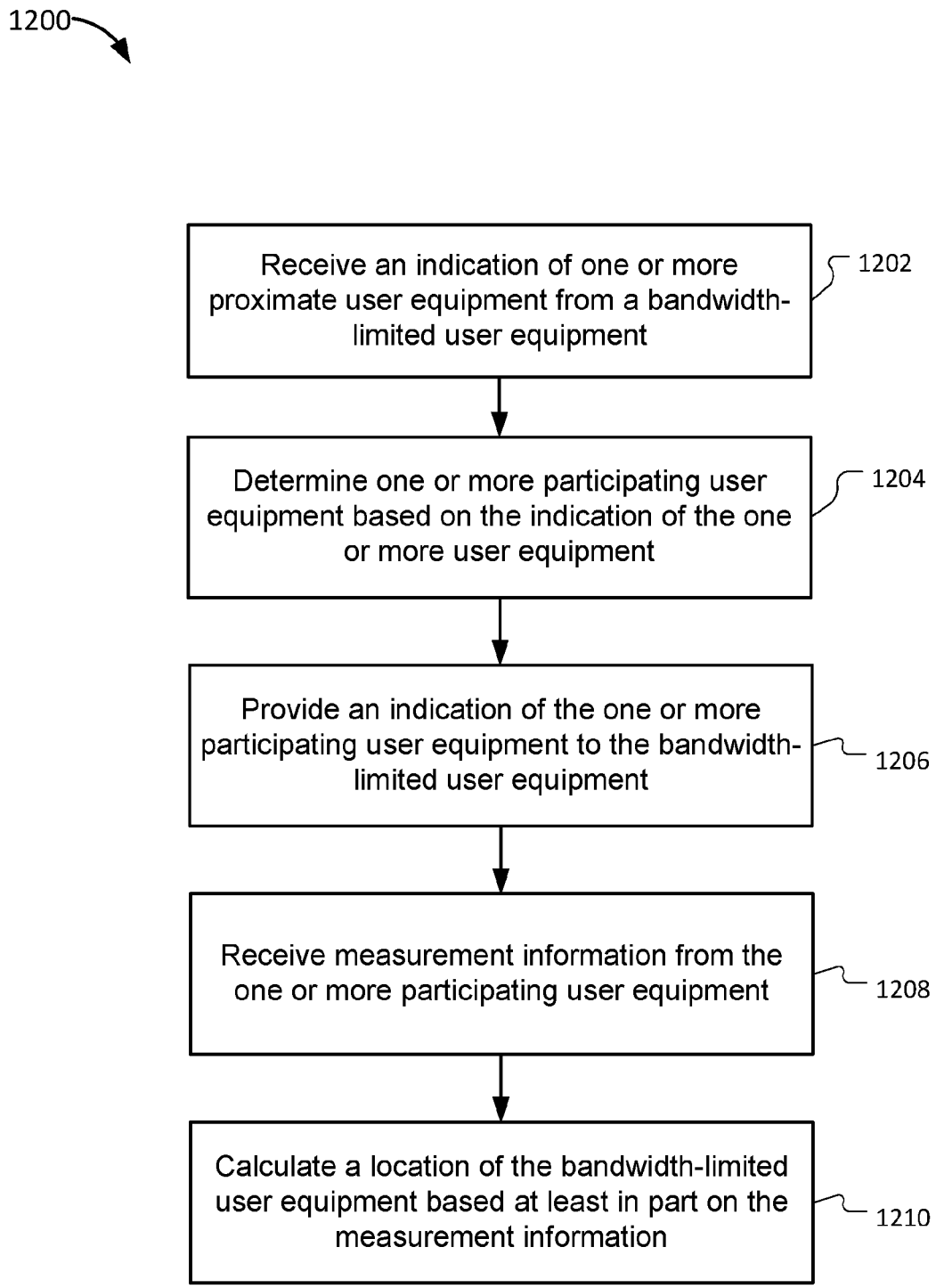
FIG. 12 is a process flow diagram of an example method for determining the location of a bandwidth-limited UE.

Referring to FIG. 12, with further reference to FIGS. 1-9, a method 1200 for determining the location of a bandwidth-limited UE includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method 1200 includes receiving an indication of one or more proximate user equipment from a bandwidth-limited UE. The communication device 326 in a network entity 306 is a means for receiving the indication. In an example, a NR-Light UE 706 is an example of a bandwidth-limited UE and may utilize the sidelink 730 to search for proximate UEs, such as the UE 704. The NR-Light UE 706 may then utilize the wireless link 722 to provide an indication, such as device ID, user ID, or other data fields associated with the UE 704, to the base station 702. The wireless sidelink 730 may be a D2D P2P link 192, 194, an NR sidelink, or other technology. The sidelink 730 may support a physical sidelink control channel (PSCCH) and/or physical sidelink control channel (PSSCH) between the UE 704 and the NR-Light UE 706.

At stage 1204, the method 1200 includes determining one or more participating user equipment based on the indication of the one or more use equipment. The processing system 336 in the network entity 306 may be means for determining one or more participating user equipment. The network entity 306 may receive indications for a plurality of proximate UEs from the NR-Light UE 706 and down-select which UEs to participate in the NR-Light UE positioning. For example, if there are more than 3 UEs, the network entity 306 may dynamically select a group of UEs based on the arability and quality of the positioning of the UEs. This selected group of UEs are the one or more participating user equipment. In an example, the NR-Light UE 706 may also receive timing measurements from the base station 702 as well as from the UEs. In this example, the base station 702 may be considered as a participating UE.

At stage 1206, the method 1200 includes providing an indication of the one or more participating user equipment to the NR-Light user equipment. The communication device 326 in a network entity 306 is a means for providing the indication of the one or more participating user equipment. The indication may include a device ID, or other identifying information to enable the NR-Light UE 706 to exchange timing messages with the proximate UE 704. In an example, the indication may include specific DL-RS IDs of specific UEs. The indication may also include frame information to facilitate the exchange of timing messages.

At stage 1208, the method 1200 includes receiving measurement information from the one or more participating user equipment. The communication device 326 in a network entity 306 is a means for receiving measurement information. The UEs 904, 906, 908 are configured to provide measurement information such as the timing measurements RTT1, RTT2, RTT3 or the computed distances 920, 922, 924, to the base station 902 via the wireless link 912. The measurement information may be included in higher layer signaling protocols (e.g., LPP) and processed by the network entity 306.

At stage 1210, the method 1200 includes calculating a location of the NR-Light user equipment based at least in part on the measurement information. The processing system 336 in the network entity 306 may be means for calculating a location of the NR-Light user equipment. The network entity 306 may be configured to utilize the location of the UEs 904, 906, 908 and the measured distances 920, 922, 924 (and possibly bearings based on AoA measurements) to determine the location of the NR-Light UE 910. For example, the network entity 306 may utilize multilateral positioning techniques to calculate the location of the NR-Light UE 910. The network entity 306 may receive a plurality of measurements from each of the participating user equipment and may utilize pruning and averaging across the measurements in calculating the location of the NR-Light UE 910.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value. e.g., the second threshold value being one value lower than the first threshold value in the resolution of a computing system.

Further, more than one invention may be disclosed.

What is claimed is:

1. A method of positioning performed by a first UE (user equipment) that is a bandwidth-limited UE, the method comprising:
   determining, by the first UE, that at least one second UE is disposed proximate to the first UE, wherein the at least one second UE is capable of using more bandwidth than the first UE for processing received signals;
   obtaining an identification for the at least one second UE from a transmission-reception point (TRP);
   receiving, based on determining that the at least one second UE is disposed proximate to the first UE, a first timing measurement signal from the at least one second UE, wherein the first timing measurement signal is received via a sidelink connection;
   transmitting, from the first UE, a second timing measurement signal to the at least one second UE, wherein the second timing measurement signal is transmitted via the sidelink connection.

2. The method of claim 1 further comprising:
   establishing a sidelink connection to the at least one second UE, wherein the first timing measurement signal is received via the sidelink connection.

3. The method of claim 1 further comprising:
   providing a measurement request message to the at least one second UE prior to receiving the first timing measurement signal; and
   providing, from the first UE, based on determining that the at least one second UE is disposed proximate to the first UE, a measurement request message to the at least one second UE to transmit a first timing measurement signal;
   wherein receiving the first timing measurement signal is based on providing the measurement request message.

4. The method of claim 1 further comprising receiving location information from the at least one second UE.

5. The method of claim 1 wherein the first timing measurement signal and the second timing measurement signal utilize a channel state information reference signal.

6. The method of claim 5 wherein the channel state information reference signal is within a physical sidelink control channel.

7. A first UE (user equipment) that is a bandwidth-limited UE, comprising:
   a memory;
   a transceiver;
   at least one processor operably coupled to the memory and the transceiver and configured to:
      determine that at least one second UE is disposed proximate to the first UE;
      obtain an identification for the at least one second UE from a transmission-reception point (TRP);
      receive, via the transceiver based on determining that the at least one second UE is disposed proximate to the first UE, a first timing measurement signal from the at least one second UE, wherein the first timing measurement signal is received via a sidelink connection, and wherein the at least one second UE is capable of using more bandwidth than the first UE for processing received signals; and
      transmit, via the transceiver, a second timing measurement signal to the at least one second UE, wherein the second timing measurement signal is transmitted via the sidelink connection.

8. The first UE of claim 7 wherein the at least one processor is further configured to establish a sidelink connection to the at least one second UE, and wherein the at least one processor is configured to receive the first timing measurement signal via the sidelink connection.

9. The first UE of claim 8 wherein the at least one processor is configured to transmit the second timing measurement signal via the sidelink connection.

10. The first UE of claim 7 wherein the at least one processor is further configured to provide a measurement request message to the at least one second UE prior to receiving the first timing measurement signal.

11. The first UE of claim 7 wherein the at least one processor is further configured to receive location information from the at least one second UE.

12. The first UE of claim 7 wherein the first timing measurement signal and the second timing measurement signal utilize a channel state information reference signal.

13. The first UE of claim 12 wherein the channel state information reference signal is within a physical sidelink control channel.

14. An apparatus for positioning a first UE (user equipment) that is a bandwidth-limited UE, comprising:
   means for determining that at least one second UE is disposed proximate to the first UE;
   means for obtaining an identification for the at least one second UE from a transmission-reception point (TRP);
   means for receiving, based on determining that the at least one second UE is disposed proximate to the first UE, a first timing measurement signal from the at least one second UE, wherein the first timing measurement signal is received via a sidelink connection, wherein the at least one second UE is capable of using more bandwidth than the first UE for processing received signals; and means for transmitting a second timing measurement signal to the at least one second UE, wherein the second timing measurement signal is transmitted via the sidelink connection.

15. The apparatus of claim 14 further comprising:
means for establishing a sidelink connection to the at least one second UE, wherein the means for receiving the first timing measurement signal are for receiving the first timing measurement signal via the sidelink connection.

16. The apparatus of claim 14 further comprising means for providing a measurement request message to the at least one second UE prior to receiving the first timing measurement signal.

17. The apparatus of claim 14 further comprising means for receiving location information from the at least one second UE.

18. The apparatus of claim 14 wherein the first timing measurement signal and the second timing measurement signal utilize a channel state information reference signal.

19. The apparatus of claim 18 wherein the channel state information reference signal is within a physical sidelink control channel.

20. A non-transitory computer-readable storage medium comprising computer-readable instructions configured to cause one or more processor to determine a position of a first UE (user equipment) that is a bandwidth-limited UE, comprising:
code for determining that at least one second UE is disposed proximate to the first UE;
code for obtaining an identification for the at least one second UE from a transmission-reception point (TRP);
code for receiving, based on determining that the at least one second UE is disposed proximate to the first UE, a first timing measurement signal from at least one second UE, wherein the first timing measurement signal is received via a sidelink connection, wherein the at least one second UE is capable of using more bandwidth than the first UE for processing received signals; and
code for transmitting a second timing measurement signal to the at least one second UE, wherein the second timing measurement signal is transmitted via the sidelink connection.

21. The non-transitory computer-readable storage medium of claim 20 further comprising:
code for establishing a sidelink connection to the at least one second UE, wherein the code for receiving the first timing measurement signal comprises code for receiving the first timing measurement signal via the sidelink connection.

22. The non-transitory computer-readable storage medium of claim 20 further comprising code for providing a measurement request message to the at least one second UE prior to receiving the first timing measurement signal.

23. The non-transitory computer-readable storage medium of claim 20 further comprising code for receiving location information from the at least one second UE.

24. The non-transitory computer-readable storage medium of claim 20 wherein the first timing measurement signal and the second timing measurement signal utilize a channel state information reference signal.

25. The non-transitory computer-readable storage medium of claim 24 wherein the channel state information reference signal is within a physical sidelink control channel.

* * * * *